Sept. 3, 1946. M. G. CLAY Re 22,785
CRANE CONTROLLING SYSTEM
Original Filed June 3, 1944 4 Sheets-Sheet 1
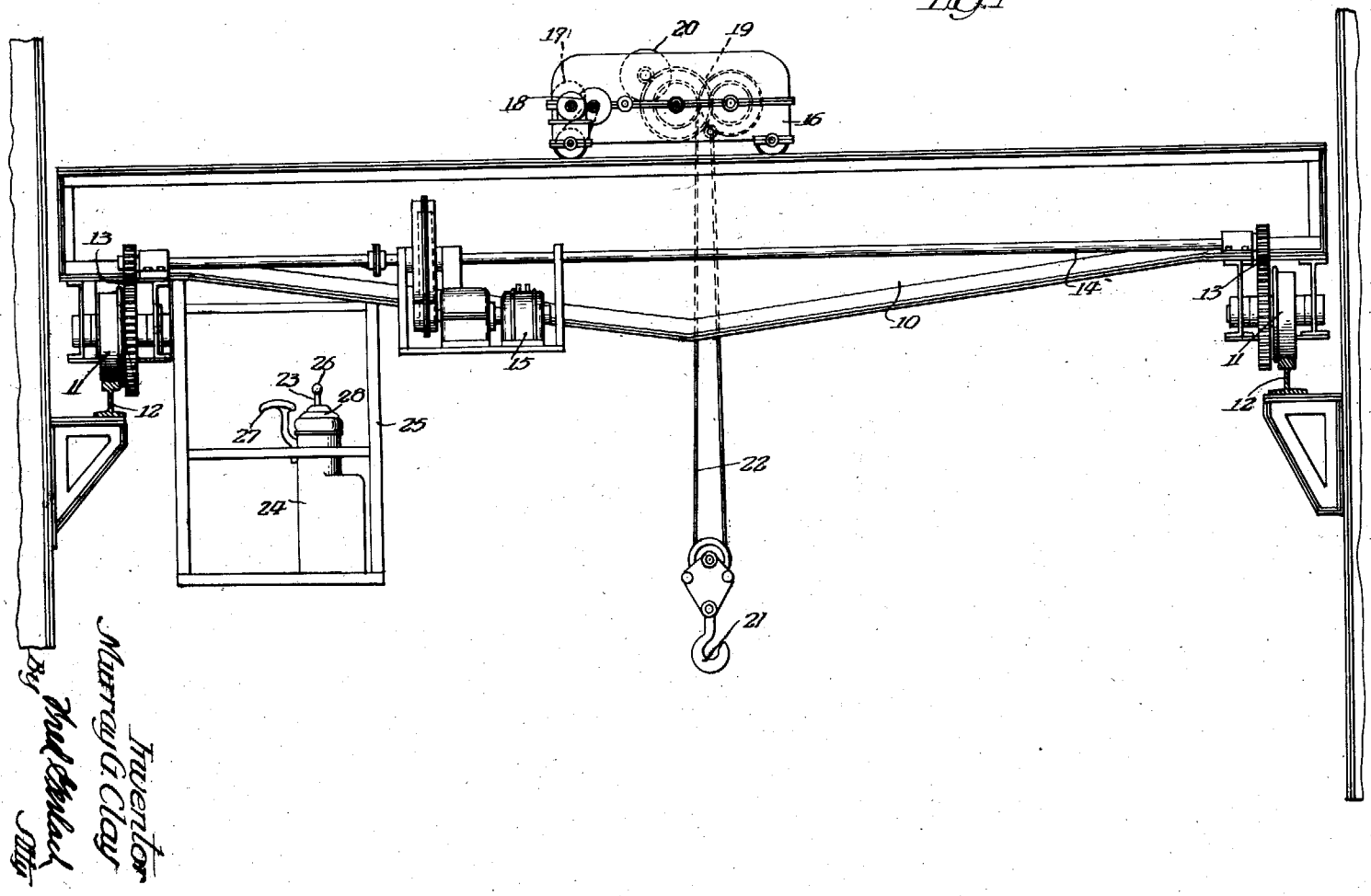

Sept. 3, 1946. M. G. CLAY Re 22,785
CRANE CONTROLLING SYSTEM
Original Filed June 3, 1944 4 Sheets-Sheet 2
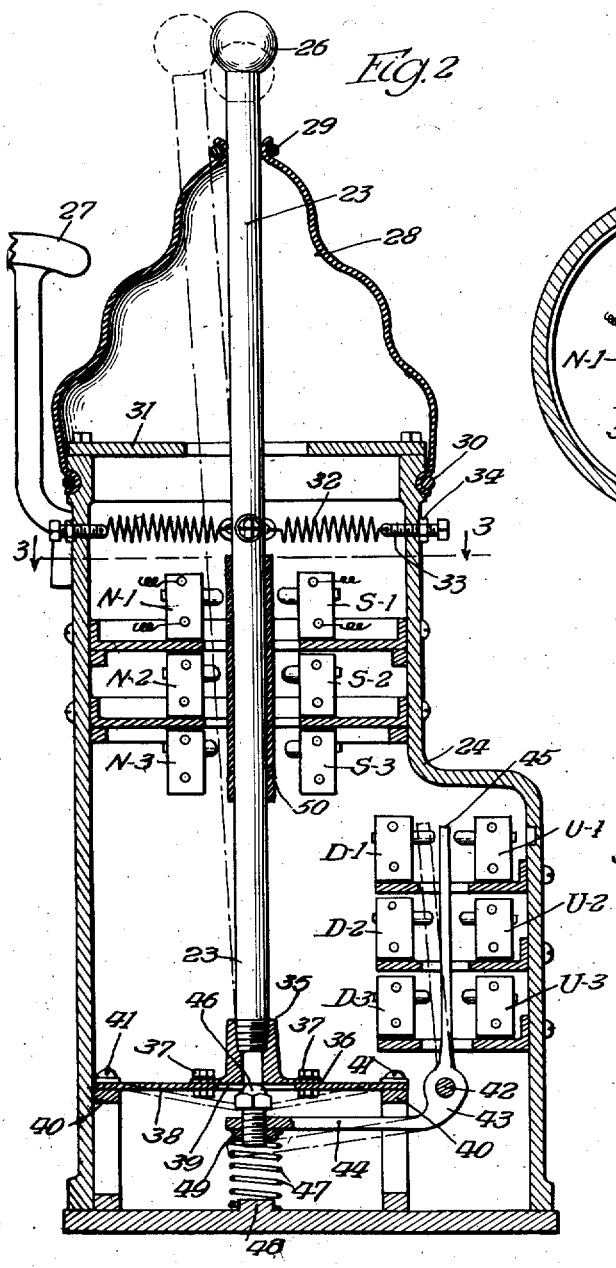
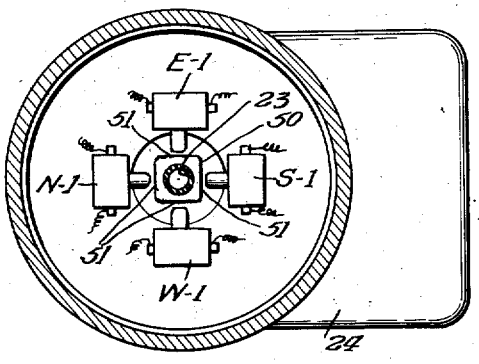
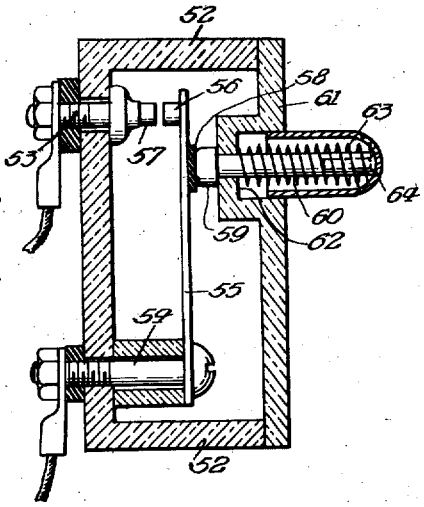
Inventor
Murray G. Clay
By Fred L. Sterlach Atty Sept. 3, 1946. M. G. CLAY Re 22,785
CRANE CONTROLLING SYSTEM
Original Filed June 3, 1944 4 Sheets-Sheet 3
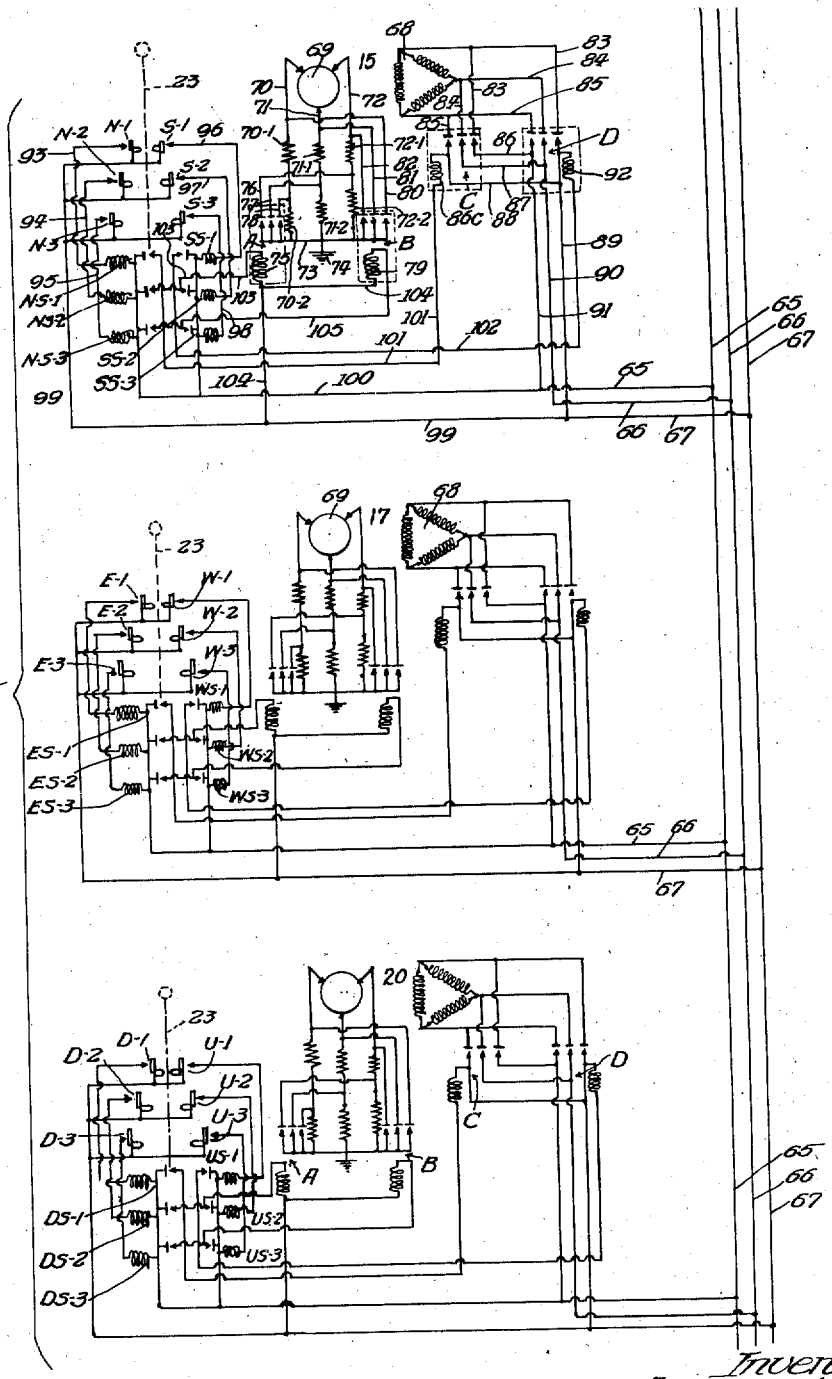
Inventor
Murray G. Clay
By Fred Gerlach Atty.

CRANE CONTROLLING SYSTEM
Original Filed June 3, 1944 4 Sheets-Sheet 4
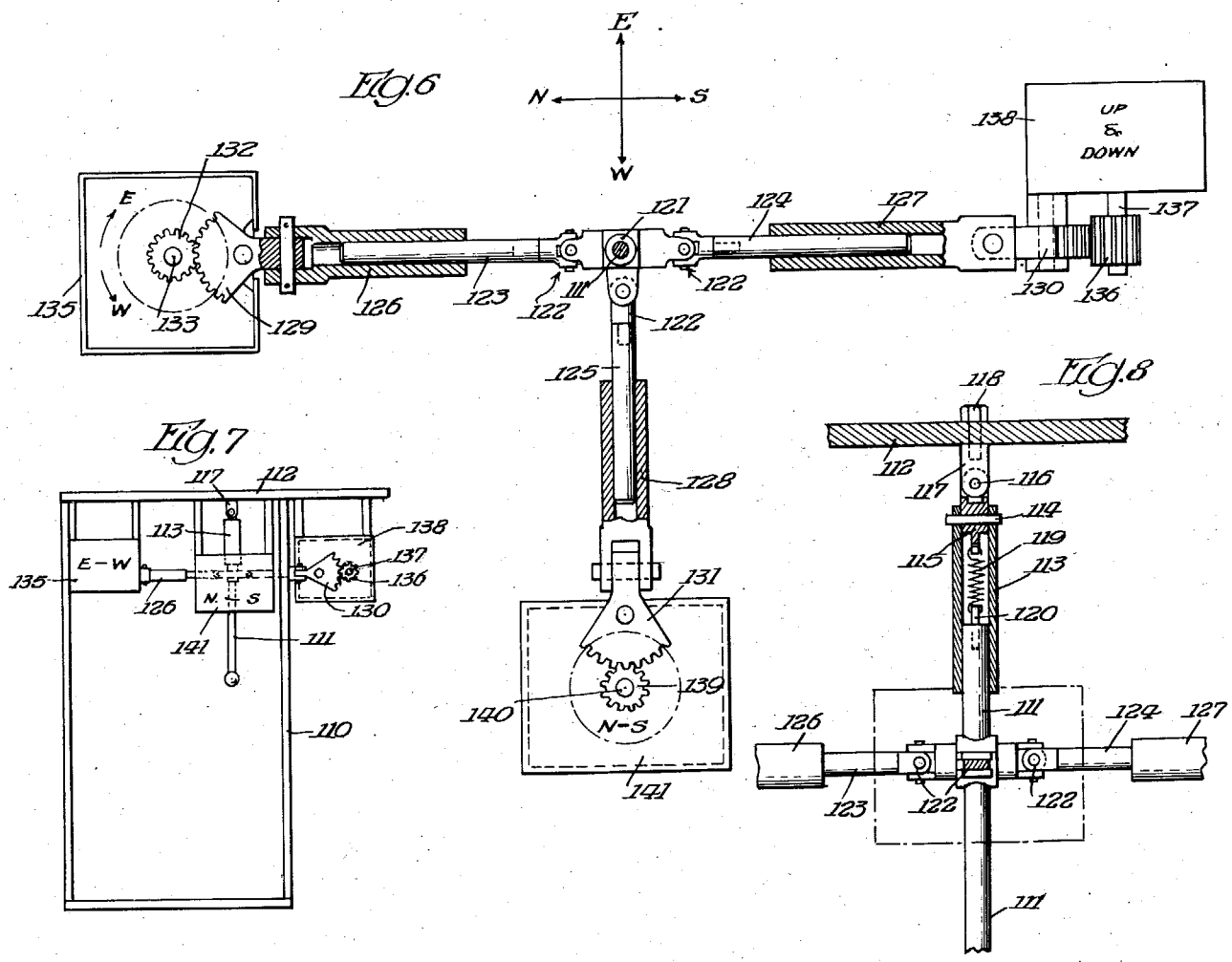
Inventor
Murray G. Clay
By Fred Gerlach
Atty Reissued Sept. 3, 1946

Re. 22,785

UNITED STATES PATENT OFFICE 22,785

CRANE CONTROLLING SYSTEM

Murray G. Clay, Chicago, Ill.

Original No. 2,391,881, dated January 1, 1946, Serial No. 538,593, June 3, 1944. Application for reissue March 27, 1946, Serial No. 657,466

29 Claims. (Cl. 212—21)

This invention relates in general to crane control including both the apparatus and a new and improved system for operating cranes. The invention comprises a single control lever and operating connections between the lever and three different crane motors for moving the lifting hook of the crane in accordance with the direction of movement of the lever.

Heretofore cranes have been provided with three separate controls located in three different positions and having practically no relation in their movement to the motion of the crane hook. It has therefore been necessary to develop skill through long training and experience to obtain a good crane operator, particularly for high speed performance.

An important object of the present invention is in combining the control of all crane movements in a single lever which may be operated by one hand, the control system being located and arranged so that the direction of movement of the crane hook is the same as that of the control lever.

A further object of the invention is to provide a controlling system operated by a single lever in which the speed of travel of the crane hook is proportional to the deflection of the control lever with an automatic return to neutral or off position when released.

A still further object of the invention is to provide a crane controlling system and apparatus for independent or combined control of the three crane motors normally used which are responsive to the direction and magnitude of movement of a single control lever.

A still further object of the invention is to provide means for logical control of the speed and direction of lifting crane hooks which may be substituted for arbitrary and illogical crane and controlling systems and apparatus, thus shortening the operator training time, and producing more efficient crane performance with less skilled personnel.

A further object of the invention is to provide a crane operating system and apparatus which is generally of new and improved construction and arrangement, and is characterized by simplicity of design as well as ease and facility of use and assembly.

Other objects of the invention and various advantages and characteristics of the present crane system and apparatus will be apparent from a consideration of the following detailed description.

The invention consists in the several novel features which are hereinafter described and more particularly defined by the claims at the conclusion hereof.

In the drawings which accompany and form a part of this specification or disclosure and in which like letters and numerals of reference denote corresponding parts throughout the several views:

Figure 1 is a side elevation of a three motor electric traveling crane embodying this invention;

Figure 2 is a sectional view of a single control lever and its enclosing casing, for operating the three crane motors;

Figure 3 is a transverse section taken on the line 3—3 of Figure 2;

Figure 4 is a detail sectional view of one of the control switches;

Figure 5 is a diagrammatic view of the control circuits for three different motors operated by a single lever;

Figure 6 is a plan view with parts in section illustrating a modification of the control levers and parts for overhead lever operation;

Figure 7 illustrates the location of the apparatus of Figure 6 in a crane controlling cage; and Figure 8 is a detail elevational view partly in section illustrating the operation of the control lever in the apparatus of Figure 6.

In a crane of this type, one motor is operated for raising and lowering of the hook; a second motor causes travel of the carriage with respect to the bridge; and a third motor effects travel of the bridge on the side rails. The operating connections in the present invention are so designed and arranged that when the single operating lever is raised or shifted upwardly, raising of the hook is effected; when the lever is shifted downwardly, the hook is lowered; when the lever is moved sidewise in one plane but from a central normally inoperative position to either of two opposite operative positions, corresponding travel of the carriage on the bridge is effected; and when the lever is shifted sidewise at right angles thereto, travel of the bridge upon its supporting rails is effected. Independent or combined control of the three motors may therefore be obtained by a movement of the lever in three dimensions such that the direction of movement of the lever determines the direction of movement of the crane hook, and the speed of movement of the hook is proportional to the amount of deflection of the lever in any direction or directions.

Referring now more particularly to the drawings, a crane bridge 10 of any well known type is provided at its ends with wheels 11 mounted on rails 12 for moving the crane transversely of its length. This is effected by gearing 13 in connection with the wheels and with a longitudinal drive shaft 14 suitably connected by reduction gearing to a driving motor 15. A wheeled carriage 16 is mounted for longitudinal movement on top of the bridge, being propelled by a driving motor 17 and a suitable reduction gearing 18 connected to the wheels. Also mounted in the carriage 16 is hoisting mechanism 19 operated by an electric motor 20 for raising and lowering a crane hook 21 by means of a cable 22.

Each of the three motors may be operated separately to move the crane hook to and fro in any of the corresponding three dimensions; any two or all three of the motors may be energized to move the hook simultaneously in two or three dimensions, and a single lever 23 is provided with controlling connections for operating any one, two or three of the motors in a direction to move the crane hook in the same direction or directions that the control lever is moved, the speed of movement of the hook in any dimension or directions being dependent upon the amount of deflection of the control lever in that particular direction or in the corresponding directions.

The control lever 23 is preferably mounted in a casing 24 located in an operator's cage 25 depending from one end of the bridge 10.

At the outer end of the lever is a hand knob 26 by which it is engaged and moved within the casing and projecting from the casing to a position near the end of the lever is an arm rest 27 so that the knob 26 may be grasped by the hand and the lever raised or lowered with the operator's arm supported by the rest 27.

Surrounding the lever near its outer end is a flexible dust seal 28 of rubber or similar material secured to the lever by a clamping ring 29 and about the upper edge of casing 24 by a clamping ring 30. The flexible seal permits the free movement of the lever in three dimensions of movement, but secured at the top of the casing is a rigid ring 31 having an inner aperture which limits the movement of the lever in opposite directions from the central position but not longitudinally thereof.

Connected to the lever 23 from four sides of the casing are coil springs 32, each secured at one end to the lever and at the outer end to a tensioning screw 33 which extends through the wall of the casing and has a lock nut 34 at the outside for holding the screw adjustably in place. These springs 32 tend to centralize the lever within the casing and also assist in returning it from endwise movement in either direction.

At the inner end of the lever 23, it is threaded into a fitting 35 having a flange 36 connected by fastening devices 37 to the inner periphery of a flexible plate or diaphragm 38 formed by a central perforation 39. The outer marginal edge of the plate whether round or square is secured to supports 40 having a fixed position in the casing 24 by means of fastening screws 41, or other suitable fastening means. This plate is of flexible material such as metal, stiff rubber or rubberlike material or a plastic and tends to maintain the lever 23 in a predetermined position.

Mounted in the casing upon a transverse pivot 42 is a lever 43 preferably in the form of a bell crank having a lower horizontal arm 44 and an upper vertical arm 45. A contact knob 46 is adjustably threaded at the end of the arm 44 in a position to engage the lower surface of the fitting 35 and to be centered by the central perforation of the fitting. Below the horizontal arm 44 and extending between it and the bottom of the casing 24 is a coil spring 47 which is centered at the casing end by a projection 48 therein and at the end of the arm by a threaded nut or disc 49 secured to the projecting threaded end of the knob 46. The arrangement is such that the spring 47 together with the flexible disc or diaphragm 38 and the springs 32 tend to hold the lever 23 in a normally centered upright position in the casing with the diaphragm 38 in substantially level position and with the arm 45 of the lever 43 in substantially upright position. The lever 23 may be moved upwardly or downwardly from this position, thereby rocking the arm 45 to one side or the other of its vertical position. If lever 23 is moved above its normal position, spring 47 will cause the knob 46 to follow the diaphragm 38, thereby rocking lever 43 accordingly and moving arm 45 to the right of its mid-position.

Secured to the control lever 23 at a distance above the lower end is a contact sleeve 50 preferably having four opposite flattened surfaces 51. Four sets of electrical switches are mounted opposite each other in pairs defining the opposite dimensions of a plane, each switch being preferably of a type as shown in Figure 4, comprising a receptacle 52 having insulated terminals 53 and 54 mounted therein and projecting through the bottom of the receptacle, one of the terminals carrying a spring conductor blade 55 with a contact 56 normally out of engagement with a contact 57 carried by the other terminal.

Secured at the outer side of the contact blade 55 is an insulating contact block 58 engaged by the head 59 of a contact pin 60 extending slidably through a cover 61 for the receptacle having a recess 62 therein for seating one end of a spring 63 surrounding the outer end of the control pin and also seating the inner end of a push button shell 64 secured to the outer end of the pin 60, as by threading it therein and engaging the outer end of the spring 63. The action of this push button switch is that engagement of the shell 64 depresses the pin 60, closing the contacts 56 and 57, and allows a continued and further depression of the push button still maintaining the contacts in engagement. Conductor wires are suitably connected to the outer ends of the terminals for each switch for making the proper circuit connections in the controlling system.

The electric control switches are arranged in sets at opposite sides of the control lever and in positions to be engaged progressively and in succession as the lever is inclined in one direction or the other or in a combination of directions. In the present invention, three switches are included in each set, those at one side of the lever as shown in Figure 2 being designated in N—1, N—2 and N—3 and those at the opposite side being correspondingly designated S—1, S—2 and S—3. The switches of each set are arranged to be operated progressively or in succession by extending the contact shells accordingly or by locating the switches at different distances from the lever so that as the lever is inclined, it will first engage No. 1 of the set, then No. 2 and No. 3 in order, still maintaining contact with the switches first operated.

In the same manner, switch sets E—1, E—2 and E—3 and W—1, W—2 and W—3 are mounted at right angles to the N—S switches for similar engagement by the operating lever 23.

At opposite sides of the upstanding arm 45 of the bell crank operating lever 43 are similar series of switches D—1, D—2, D—3 and U—1, U—2, U—3 which are operated in succession, depending upon the downward or upward movement of the lever 23 as transmitted through the operating lever 43.

This invention is shown diagrammatically as applied to three-phase induction motors of the variable speed slip ring type, each provided with brushes contacting the slip rings connected to variable external resistances for speed variation. There are three separate motors designated 15, 17 and 20, all similarly connected through their corresponding control switches and all connected to the same three phase power supply mains 65, 66 and 67. Each of the three motors has the same construction and connections and the detailed description of the operation of one motor will suffice for each of the three.

Each motor has a stator 68 represented by the three connected windings, and a rotor 69 represented as having three connected slip ring conductors 70, 71 and 72. In the circuit with conductor 70 are resistances 70—1, 70—2; in circuit with conductor 71 are resistances 71—1 and 71—2; and connected with conductors 72 are resistances 72—1 and 72—2, and the three conductors are joined by conductor 73 and arranged to common ground 74. When the rotor is started all the resistances are in series with their respective windings and to increase the speed of the motor, an electromagnetic switch A is provided having a winding 75 for energizing the switch and closing the contacts thereof through conductors 76, 77 and 78, to short circuit resistances 70—2, 71—2 and 72—2. Likewise another electromagnetic switch B is provided having an energizing winding 79 for closing circuits through conductors 80, 81 and 82 to conductors 70, 71 and 72 respectively, short circuiting resistances 70—1, 71—1 and 72—1 through the ground conductor 73 and ground conductor 74. The windings of stator 68 receive current through conductors 83, 84 and 85 from the current supply mains 65, 66 and 67 to impel the motor in one direction or the other, depending upon whether electromagnetic switch C or D is closed. Switch C has an energizing coil 86c for connecting the stator conductors through conductors 83, 87 and 86 to conductors 89, 90 and 91, respectively, and thence to the circuit mains 67, 66 and 65, respectively, whereas the closing of the switch D by energizing its winding 92 will reverse the field connection so that conductors 83, 84 and 85 are connected by the switch D to conductors 89, 90 and 91, respectively, and thence to the circuit conductor mains in reverse order for reversely rotating the motor 15.

Each of the control switches N—1, N—2, N—3 and S—1, S—2, S—3 has a corresponding coil operated switch NS—1, NS—2, NS—3 and SS—1, SS—2, SS—3 connected thereto from the switches by conductors 93, 94, 95 and 96, 97, 98, respectively, all of the switches having a common conductor 99 leading from one of the mains 67 to one side thereof, and all of switches NS—1, NS—2, NS—3, SS—1, SS—2, SS—3 having a common conductor 100 leading from the other side of the respective coils to the other current supply main 65.

Switch NS—1 closes a connection with a conductor 101 leading to the winding 86c of directional switch C; and switch SS—1 closes the connection through conductor 102 with the winding 92 of the opposite directional switch D. Switch NS—1 is energized when control lever 23 is moved to close switch N—1 which in turn closes the energizing circuit through the winding 86 of directional switch C.

If the control lever 23 is turned in the opposite direction, the directional switch D is similarly operated. This will cause the operation of the motor 15 with all of the starting resistances in circuit, thereby resulting in the starting or slow speed operation of the motor. If the lever 23 is sufficiently inclined to engage the next switch N—2, a circuit is closed through control switch NS—2 which will close a circuit through a conductor 103 leading from the switch to the winding 75 of short circuiting switch A, the other side of the winding being connected by conductor 104 to conductor 99 and thence to circuit main 67. This will energize switch A, short circuiting the starting resistances 70—2, 71—2 and 72—2.

Continued operation of the lever 23 to engage contact switch N—3 will close the circuit through the winding of switch NS—3 which will then close a circuit through conductor 105 to one end of the winding 79 of short circuiting switch B, the other side of the winding being connected by conductor 104 with conductor 99 and thence to supply main 67. Operation of switch B will short circuit the first group of resistances 70—1, 71—1, and 72—1 whereupon all of the rotor resistances will be short circuited and the motor 15 will be operating at full speed.

The circuits closed in the operation of any one of the motors may be traced as follows:

Assuming that the control lever 23 is moved to the left in Figure 5 to engage the first switch N-1, a circuit is closed from supply main 67 through conductor 99, switch N-1, conductor 93, winding of switch NS-1 and conductor 100 to supply main 65; operation of switch NS-1 will close a circuit from main 65, common conductor 100 through the switch NS-1, conductor 101, winding 86c of directional switch C, conductors 88 and 89 to supply main 67; operation of directional switch C will connect field conductors 83, 84 and 85 through switch conductors 86, 87, 88 and conductors 91, 90 and 89, respectively, to current supply mains 65, 66 and 67. This will cause excitation of the field windings 68 to operate the motor in the indicated north direction and at slow speed since the resistances of the rotor 69 are all in circuit.

Engagement by the operating lever 23 with the next operating switch N—2 will close a circuit from supply main 67 through common conductor 99, switch N—2, conductor 94 to winding of switch NS—2 and thence by conductor 100 to supply main 65; operation of switch NS—2 will close the circuit of supply main 65 through conductor 100, switch NS—2, conductor 103, winding 75 of short circuiting switch A, and thence through conductors 104 and 99 to supply main 67. Operation of switch A will short circuit resistances 70—2, 71—2 and 72—2 by means of conductors 78, 77 and 76 which are connected to conductors 70, 71 and 72, respectively, between the two groups of short circuiting resistances and through switch A to the common ground 74. Likewise a continuation of the movement of lever 23 will cause it to engage switch N—3 which will close the circuit from current supply main 67, common conductor 99 through switch N—3, conductor 95, winding of switch NS—3 to conductor 100 and thence to supply main 65.

Operation of switch NS—3 closes the circuit from supply main 65 through conductor 100, switch NS—3, conductor 105, winding 79 of short circuiting switch B, conductors 104 and 99 to the other current supply main 67.

Operation of the switch B, short circuits the first group of resistances 70—1, 71—1, 72—1 by means of conductors 80, 81 and 82 which are connected directly to conductors 70, 71 and 72, respectively, adjacent the slip ring connection with the rotor, and through the contacts of switch B directly to the common ground 74. In this case the slip rings are short circuited and the motor is operated at high speed.

In the reverse movement of the operating lever 23 switch N—3 is first opened which thereupon opens short circuiting switch B, placing the resistances 70—1, 71—1 and 72—1 of the first group in connection with the slip ring conductors of the rotor 69, reversing the action above described and initially slowing the motor; opening of a next switch N—2 deenergizes winding 75 of speed control switch A which opens the shunts around the second group of resistances 70—2, 71—2 and 72—2, thereby inserting these resistances in the slip ring circuits, and effecting the further slowing of the motor. When the last switch N—1 is opened, the winding of directional switch C is deenergized and the connections to the field conductors are opened, thereby cutting off all current to the motor.

When the lever 23 is turned in the opposite direction engaging the "S" push switches, the same procedure is repeated except that directional switch D reverses two of the field winding connections with the supply mains which causes the opposite excitation of the field winding, resulting in opposite direction of rotation of the rotor.

A similar operation of switches S—2 and S—3 will energize the windings of switches A and B in a similar manner for speeding up the motor.

Each of the other motors 17 and 20 is operated in exactly the same way by its control switches E—1, E—2, E—3 and W—1, W—2, W—3 and motor D by its switches D—1, D—2, D—3 and U—1, U—2, U—3.

While the present invention is described as embodying slip ring alternating current motors, it will be understood that a similar control operated by switches similarly arranged and engaged in succession may be applied to direct current motors which are reversible in direction and in which the speed may be varied by change in resistance.

In operation, it is necessary only for the operator to move the control lever in the direction in which he wishes the crane to travel and the carriage to be positioned on the crane. If at the same time he wishes to raise or lower the hoisting hook, he may correspondingly raise or lower the lever so that the hook will actually be travelling in three dimensions, and in the same direction toward which the operating lever is inclined. If the lifting hook is positioned in the proper location, it may be raised and lowered and the speed increased or decreased as desired by simply raising and lowering the lever to a greater or less extent. Likewise, the crane may be caused to travel upon its supporting rails or the carriage may be moved upon the crane independently of any other movement. For increased speed of travel in the same direction, the operator simply moves the control lever further in the same direction, thus increasing the speed of the motor. In the reverse movement of the lever from high speed, it will be noted that one group of resistances will be cut in and then the other group of resistances will be inserted to correspondingly reduce the speed of the motor, in a well known manner.

For any combinations of movement, it will be noted that the contact sleeve 50 of the operating lever 23 will make engagement with any two adjacent sets of switches at the same time so that both of the motors for any area may be operated at high, intermediate or low speeds, or any combination thereof depending upon the direction and extent of inclination of the control lever. The extent of raising and lowering of the control lever is also independent of and may be combined with any movement of the lever in the other two dimensions.

Instead of providing an upright control lever and a unitary control casing as described, it may be desirable, as shown in Figures 6 to 8, to provide an overhead type of control in which an operator's cage 110 may be mounted as shown in Figure 1, or in any other suitable manner. A controlling lever 111 is suspended from a top support 112 by means of a sleeve 113 in which it is slidable. The sleeve is mounted at its upper end by a universal joint comprising a pivot 114 extending through a block 115 which, in turn, is mounted upon a pivot 116 at right angles to the pivot 114 supported in a swivel bracket 117 attached to the top by a fastening bolt 118. The control lever 111 thus has a universal swinging movement about the upper end of the sleeve 113 and is movable longitudinally therein against the tension of a spring 119 which is connected at its upper end to the block 115 and at its lower end to a projection 120 at the upper end of the lever.

Secured to the controlling lever 111 intermediate its ends is a sleeve fitting 121 having three universal joints 122 for connecting it to rods 123 and 124 extending opposite to each other and 125 at right angles thereto. These rods are slidable in sleeves 126, 127 and 128, respectively, each of which is pivoted to a corresponding gear sector 129, 130 and 131. For each gear sector, there is a corresponding electrical controller casing for making and breaking electrical connections for circuits similar to those shown in the diagram Figure 5, the particular form of the circuit closing mechanism being immaterial, the gear segment 129 meshing with a pinion 132 mounted on a shaft 133 in the E—W controller 135; the segment 130 meshing with a pinion 136 mounted on a shaft 137 in the up and down controller 138; and the segment 131 meshing with a pinion 139 mounted on a shaft 140 in the N—S controller 141.

With this construction, the operator, as before, moves the lever 111 in the direction in which he wishes the crane and the hoisting hook to travel and be moved.

If the operator, facing the operating lever 111 in Figure 7, wishes to move the crane hook to his left or in the direction north, the rod 123 slides into its sleeve 126 and the rod 124 slides outwardly in its sleeve 127 without moving either the E—W or up and down controllers; but the lateral movement of the lever 111 with respect to rod 125 swings the lever about its universal joint 122 and correspondingly inclines sleeve 128, thereby rocking gear 131 in a direction to rotate pinion 139 and thus to affect the N—S controller 141. The reverse movement of the control lever in the opposite direction or to the right causes the opposite movement of the gear and shaft 140 in the N—S controller.

In the same manner, the E—W controller is operated in opposite directions if the lever 111 is inclined toward and from the operator in the E—W directions as indicated at the top of Figure 6.

If the operator desires to elevate or lower the crane hook, he raises or lowers the control lever accordingly. If he wishes only to move the controller hook up or down, without affecting the other two controllers, the sleeves 126 and 128 may be inclined, depending upon the raising or lowering movement of the control lever, but their connecting rods 123 and 125, respectively, will simply slide in the corresponding sleeves. An up or down movement of the operating lever will cause the corresponding movement of sleeve 127 and also a corresponding turning movement of the pinion 136 and its shaft 137 in the up and down controller 138.

If the operator wishes to combine the operation of two or more of the motors which are operated by the controllers, it is necessary only to move the control lever in the direction in which he wishes the crane and the crane hook to move, combining the operation of two controllers, or three controllers, as desired. The controlling circuits for each separate motor relating to each of the three control boxes is substantially the same as shown in the diagram, Figure 5, or any suitable arrangement for similarly operating three motors from the same current supply mains.

With these constructions, it is apparent that independent or combined control of three crane motors may be obtained responsive to the direction and magnitude of a single control lever deflection or movement. In this manner, a logical control of the speed and direction of crane hooks may thus be substituted for arbitrary and illogical crane control making the controller operation almost as simple as a pointer. This shortens the time necessary for training an efficient crane operator and produces more reliable performance with a less skilled operator.

While this invention is described as applying particularly to the operation of a lifting crane, it is apparent that this control and operation may also be applied to any three directional control or three dimensional space operator which has three different motors.

The invention is therefore not to be understood as restricted to the details set forth since these may be modified within the scope of the appended claims without departing from the spirit and scope of the invention.

Having thus described the invention, what I claim as new and desire to secure by Letters Patent is:

1. A crane controlling system for operating a lifting hook in three dimensions of space, comprising three separate reversible driving motors each for operating the hook in one of the respective dimensions, a single controlling member movable in three space dimensions, and reversing switch contacts with independent circuit connections for the motors each arranged to be actuated, operated and controlled by corresponding movement of the controlling member in one or more of said dimensions for respectively actuating any one, two, or all three of the motors at the same time.

2. A multiple motor controlling system for causing a resultant movement of an operating member in space, comprising three separate driving motors, one for moving the member in each of the corresponding three space dimensions respectively, a single controller for the three motors movable in any combination of the three space dimensions corresponding to the motors, and switch contacts with circuit connections for the motors operated and actuated by the controller for actuating any one, two or all three of the motors to cause a movement of the operated member in the direction in which the controller is operated.

3. A multiple motor control system for operating a member in three dimensions of space, comprising a separate driving motor for operating the member in each of the space dimensions, switch contacts with circuit connections for each of the motors, a single controller also movable in any combination of the three space dimensions having means for engaging the switch contacts to operate the motors independently and in unison and additional switch contacts with speed controlling circuit connections for each of the motors and arranged for operation by the controller for operating each of the motors at a speed proportional to the movement of the controller in that direction.

4. A multiple motor control system for operating a member in any one of the three dimensions of space, comprising a separate motor for operating the member in each respective space direction, switch contacts and speed controlling circuit connections for each motor for moving the member at different speeds in the direction controlled by that motor, and a single controller having means to engage the switch contacts for each of the three motors and also movable in space in the actual direction in which the member is to be driven by any one or more of the motors.

5. A multiple motor controlling system for operating a member in three dimensions of space, comprising three separate reversible driving motors, each operating the member to and fro in its corresponding different space dimension, switch contacts and circuit connections for each motor by which it operates the member to and fro in its corresponding space dimension, and a single controller movable in any combination of the three space dimensions in which it is desired to move the member having contact means for engaging the respective switch contacts of the different motor circuits to effect the movement of the member in that direction.

6. A reversible motor controlling system for operating a member in any combination of the three dimensions of space, comprising three separate multiple speed reversible driving motors for operating the member in the three respective dimensions, switch contact and speed controlling circuit connections for each of the motors by which it is reversibly operated and controlled at different speeds in its respective space dimension, and a single controller movable to a greater or less extent in any of the three dimensions having contact means to engage the switch contacts of one, two, or all three of the operating motors, either independently or in conjunction to cause a motor driven movement of the member in the same direction in which the controller is moved and at a speed in any of the component directions dependent upon the proportion of the entire movement of the controller in that direction.

7. A crane controlling system for operating a lifting hook in any one or more of the three dimensions of space, comprising three separate driving motors each for separately and reversibly operating the hook in its corresponding dimension, switch contacts with circuit and speed controlling connections for each of the motors to move the hook back and forth in its respective space dimensions, the switch contacts being arranged to reverse the motor and to drive it at different speeds in either direction, and a single controller movable in any dimension and in any combination of the space dimensions to engage the switch contacts of one, two or all of the motors at the same time for driving the lifting hook in the same direction in which the controller is pointed, and the speed of the motor in any dimension being proportional to the amount of movement of the controller in that component of the direction.

8. In a crane controlling system for operating a lifting hook in any one of the three dimensions of space, comprising three separate driving motors, one for each respective space component, switch contacts with circuit and speed controlling connections for each motor for operating the motor in reverse directions and in the same directions at different speeds, and a controller movable in any dimension and combination of dimensions for engaging the switch contacts to drive the motor in one direction or the other depending upon the direction of movement of the controller, and to drive the motor at different speeds depending upon the proportional movement of the controller in the direction in which it is moved.

9. In a crane controlling system, a lifting hook and a motor for raising and lowering the hook, a carriage in which the hook lifting mechanism is mounted and a motor for operating the carriage, a crane bridge in which the carriage is longitudinally movable and a motor for moving the bridge transversely thereof, an operator's cage carried by the bridge, a controller having a single operating member projecting therefrom and movable in any direction and combination of directions with respect thereto, different sets of switch contacts in the controller with circuit connections and speed controlling circuit means for each of the three motors, the switch contacts being arranged in the controller for engagement by the operating member to operate each motor in either direction of rotation depending upon the movement of the member and at different speeds in either direction dependent upon the extent of movement of the member in that particular direction to move the hook in the same direction as that of the operating member.

10. In a controlling system for three separate motors, a set of electrical reversing switches and circuit connections with speed controlling means for each motor, a single operating member and means mounting it for movement in any direction or combination of directions in three different dimensions, one dimension for each set of switches, the switches of each set being arranged for successive engagement by said member moved in one dimension to start and vary the speed of the motor, and the switches of either or both of the other sets being arranged for successive engagement by said member in either or both of the other dimensions independent of the first set of switches and jointly with the operation thereof.

11. In a controlling system for three separate motors, a single operating lever and means mounting it for swinging movement to and fro in one direction and in a direction at right angles thereto and at any angle between the two directions and also for moving the lever longitudinally, a set of electrical reversing switches and circuit connections with speed controlling means therefrom for each motor, the switches being arranged for engagement by the lever by that component of its movement in either direction from a central position and in directions at right angles thereto, and means for operating the switches of the third set by the longitudinal movement of the operating member.

12. In a controlling system for three separate motors, a single operating member and means mounting it for swinging movement in opposite directions from a central position and in opposite directions at right angles thereto and at any angle therebetween and also for moving the lever longitudinally in opposite directions, a set of electrical reversing switches and circuit connections with speed controlling means for each motor, the switches being arranged in opposite sets for utilizing said speed controlling means to drive the motors at different speeds in opposite directions, means for limiting the swinging movement of the lever, means for limiting the longitudinal movement of the lever, and resilient means tending to retain the lever normally in a neutral position in which none of the switches are operated.

13. In a controlling system for three motors, a single operating member and means mounting it for swinging movement in opposite directions about one end for swinging movement in opposite directions at right angles thereto and at any angle therebetween and for longitudinal movement in opposite directions; sets of electrical reversing switches and circuit connections with speed controlling means for each motor, the electrical switches for each motor arranged for engagement by the lever depending upon the components of its movements in its three different operating directions, and the means for operating the switches by the longitudinal movement of the lever comprising a bell crank having one arm moved by the lever in its longitudinal direction of movement and the other arm for engaging opposite sets of electrical switches for one of the motors depending upon the longitudinal movement of the lever.

14. In a crane controlling system for three separate motors, a single operating lever and means mounting it for swinging movement about one end in two directions and at any angle therebetween, one direction at right angles to the other and the lever also being mounted for longitudinal movement, said means comprising a flexible diaphragm at the said end, a perforated plate spaced from the other end through which the lever extends for limiting the swinging movement of the lever from its central position, a spring pressed lever engaging the mounted end of the lever, and a set of electrical reversing switches and circuit connections with speed controlling means for each motor, the switches engaged by the operating lever and the spring pressed lever dependent upon the direction of movement of the operating lever.

15. In a controlling system for three separate motors, a single operating lever movable in any direction or combination of directions in the three spaced dimensions, a set of electrical reversing switches and circuit connections with speed controlling means for each motor, a contact sleeve carried by the operating member for engaging one or more switches of a set for each motor depending upon the direction and component of movement of the operating lever in dimensions at right angles to each other from a central position, means engaged by the lever in its endwise movement for operating the switches of one of the motors in either direction of rotation and at various speeds in each direction, the sleeve engaging two adjacent sets of electrical switches for controlling the direction and speed of the motors for the paths at right angles to each other independent of the direction and speed of the third motor.

16. In a controlling system for a plurality of motors, a set of electrical reversing switches and circuit connections with speed controlling means for each motor, a single operating member and means mounting it for movement in any direction or combination of directions of the three different space directions, one direction for each corresponding set of switches, the switches of each set being similar and arranged for engagement by the lever in succession at either side of a normal central position, the first switch closing and operating circuit to the motor depending upon the direction the lever is moved from its central position, and the second and third switches of the set engaged by the lever increasing the speed of the motor for the corresponding direction of rotation thereof, the sets of switches being actuated by the operating member only in proportion to that component of the composite direction in which it is moved.

17. In a controlling system for three separate motors, a set of electrical reversing switches and circuit connections with speed controlling means for each motor, a single operating lever and means mounting it for movement in space as defined by three different directions, one corresponding direction for each different motor, said mounting means comprising a flexible diaphragm at one end of the lever, a spring pressed lever engaging the operating lever at the diaphragm end tending to hold it in neutral position, one of the sets of electrical switches being arranged for operation by said spring pressed lever, means for limiting the movement of the free end of the spring pressed lever, and a set of centering springs connected to an outer fixed support and to the operating lever at a distance from the mounting end and tending to return the lever to a neutral central position both transversely and longitudinally of the lever.

18. In a motor controlling system of the class described, a controller casing for a plurality of sets of reversing switch contacts having circuit and speed controlling connections, a single operating member projecting from the controlling casing and movable universally in space as defined by opposite directions and longitudinally to engage the contacts and close the different circuit and speed controlling connections, and an arm rest on the casing adjacent the end of the operating member to engage the arm of an operator leaving the hand free and to give it leverage for moving the operating member in opposite directions and longitudinally.

19. In combination with a crane embodying an overhead bridge mounted to travel back and forth in a direction transverse to its length, provided with a reversible variable speed prime mover for propelling it back and forth, and also provided with a cage for an operator, a carriage mounted on the bridge to travel lengthwise thereof and provided with a reversible variable speed prime mover for propelling it back and forth on the bridge, and a hoisting mechanism supported by the carriage and including a depending lifting element and a reversible variable speed prime mover for raising and lowering said lifting element, a crane controlling system comprising a single control member mounted in the cage so that it is movable in three space directions from a neutral position and having spring means for urging it into its neutral position, and control connections between the control member and the prime movers whereby the latter are so controlled in response to movement of the control member from its neutral position that they cause the lifting element to move in the same direction as said control member, said control connections being designed and constructed in such manner that in connection with movement of the control member from its neutral position they so control the prime movers that the speed of operation thereof is proportional to the amount or degree of movement of the control member.

20. In combination with a crane embodying an overhead bridge mounted to travel back and forth in a direction transverse to its length and provided with a reversible variable speed prime mover for propelling it back and forth, a carriage mounted on the bridge to travel lengthwise thereof and provided with a reversible variable speed prime mover for propelling it back and forth on the bridge, and a hoisting mechanism supported by the carriage and including a depending lifting element and a reversible variable speed prime mover for raising and lowering said lifting element, a crane controlling system comprising a single control member mounted so that it is movable in three space directions from a neutral position, and control connections between the control member and the prime movers whereby the latter are so controlled in response to movement of the control member from its neutral position that they cause the lifting element to move in the same direction as said control member, said control connections being designed and constructed in such manner that in connection with movement of the control member from its neutral position they so control the prime movers that the speed of operation thereof is proportional to the amount or degree of movement of the control member.

21. In combination with a crane embodying an overhead bridge mounted to travel back and forth in a direction transverse to its length and provided with a reversible prime mover for propelling it back and forth, a carriage mounted on the bridge to travel lengthwise thereof and provided with a reversible prime mover for propelling it back and forth on the bridge, and a hoisting mechanism carried by the carriage and including a depending lifting element and a reversible prime mover for raising and lowering said lifting element, a crane controlling system comprising a single control member mounted so that it is movable in three space directions from a neutral position, and control connections between the control member and the prime movers whereby the latter are so controlled in response to movement of the control member from its neutrol position that they cause the lifting element to move in the same direction as said control member.

22. In combination with a crane embodying an overhead bridge provided with a cage for an operator, a carriage mounted on the bridge to travel lengthwise thereof and provided with a reversible variable speed prime mover for propelling it back and forth on the bridge, and a hoisting mechanism supported by the carriage and including a depending lifting element and a reversible variable speed prime mover for raising and lowering said element, a crane controlling system comprising a single control member mounted in the cage so that it is movable from a neutral position laterally back and forth in the same direction as the carriage and also up and down and having associated therewith spring means for urging it into its neutral position, a control connection between the control member and the first mentioned prime mover whereby the latter is so controlled in response to lateral movement of the control member from its neutral position that it causes the carriage to move in the same direction as said control member, and a control connection between the control member and the second mentioned prime mover whereby the latter is so controlled in response to either up or down movement of said control member from its neutral position that it causes the lifting element to move in the same direction as said control member, said control connections being designed and constructed in such manner that in connection with movement of the control member from its neutral position they so control the prime movers that the speed of operation thereof is proportional to the amount or degree of movement of the control member.

23. In combination with a crane embodying an overhead bridge, a carriage mounted on the bridge to travel lengthwise thereof and provided with a reversible variable speed prime mover for propelling it back and forth on the bridge, and a hoisting mechanism supported by the carriage and including a depending lifting element and a reversible variable speed prime mover for raising and lowering said lifting element, a crane controlling system comprising a single control member mounted so that it is movable from a neutral position laterally back and forth in the same direction as the carriage and also up and down, a control connection between the control member and the first mentioned prime mover whereby the latter is so controlled in response to lateral movement of the control member from its neutral position that it causes the carriage to move in the same direction as said control member, and a control connection between the control member and the second mentioned prime mover whereby the latter is so controlled in response to either up or down movement of said control member from its neutral position that it causes the lifting element to move in the same direction as said control member, said control connections being designed and constructed in such manner that in connection with movement of the control member from its neutral position they so control the prime movers that the speed of operation thereof is proportional to the amount or degree of movement of the control member.

24. In combination with a crane embodying an overhead bridge, a carriage mounted on the bridge to travel lengthwise thereof and provided with a reversible prime mover for propelling it back and forth on the bridge, and a hoisting mechanism supported by the carriage and including a depending lifting element and a reversible prime mover for raising and lowering said lifting element, a crane controlling system comprising a single control member mounted so that it is movable from a neutral position laterally back and forth in the same direction as the carriage and also up and down, a control connection between the control member and the first mentioned prime mover whereby the latter is so controlled in response to lateral movement of the control member from its neutral position that it causes the carriage to move in the same direction as said control member, and a control connection between the control member and the second mentioned prime mover whereby the latter is so controlled in response to either up or down movement of said control member from its neutral position that it causes the lifting element to move in the same direction as said control member.

25. In combination with a crane embodying an overhead bridge mounted to travel back and forth in a direction transverse to its length, provided with a reversible variable speed prime mover for propelling it back and forth, and also provided with a cage for an operator, and a hoisting mechanism associated with the bridge and including a depending lifting element and a reversible variable speed prime mover for raising and lowering the element, a crane controlling system comprising a single control member mounted in the cage so that it is shiftable from a neutral position laterally back and forth in the direction of movement of the bridge and also up and down and having associated therewith spring means for urging it into its neutral position, a control connection between the control member and the first mentioned prime mover whereby the latter is so controlled in response to lateral movement of the control member from its neutral position that it causes the bridge to move in the same direction as said control member, and a control connection between the control member and the second mentioned prime mover whereby the latter is so controlled in response to either up or down movement of said control member from its neutral position that it causes the lifting element to move in the same direction as said control member, said control connections being designed and constructed in such manner that in connection with movement of the control member from its neutral position they so control the prime movers that the speed of operation thereof is proportional ot the amount or degree of movement of the control member.

26. In combination with a crane embodying an overhead bridge mounted to travel back and forth in a direction transverse to its length and provided with a reversible variable speed prime mover for propelling it back and forth, and a hoisting mechanism associated with the bridge and including a depending lifting element and a reversible variable speed prime mover for raising and lowering said lifting element, a crane controlling system comprising a single control member mounted so that it is shiftable from a neutral position laterally back and forth in the direction of movement of the bridge and also up and down, a control connection between the control member and the first mentioned prime mover whereby the latter is so controlled in response to lateral movement of the control member from its neutral position that it causes the bridge to move in the same direction as said control member, and a control connection between the control member and the second mentioned prime mover whereby the latter is so controlled in response to either up or down movement of said control member from its neutral position that it causes the lifting element to move in the same direction as said control member, said control connections being designed and constructed in such manner that in connection with movement of the control member from its neutral position they so control the prime movers that the speed of operation thereof is proportional to the amount or degree of movement of the control member.

27. In combination with a crane embodying an overhead bridge mounted to travel back and forth in a direction transverse to its length and provided with a reversible prime mover for propelling it back and forth, and a hoisting mechanism associated with the bridge and including a depending lifting element and a reversible prime mover for raising and lowering said lifting element, a crane controlling system comprising a single control member mounted so that it is shiftable from a neutral position laterally back and forth in the direction of movement of the bridge and also up and down, a control connection between the control member and the first mentioned prime mover whereby the latter is so controlled in response to lateral movement of the control member from its neutral position that it causes the bridge to move in the same direction as said control member, and a control connection between the control member and the second mentioned prime mover whereby the latter is so controlled in response to either up or down movement of said control member from its neutral position that it causes the lifting element to move in the same direction as said control member.

28. In combination with a crane embodying an overhead bridge mounted to travel back and forth in a direction transverse to its length, provided with a reversible variable speed prime mover for propelling it back and forth and also provided with a cage for an operator, and a carriage mounted on the bridge to travel lengthwise thereof, provided with a reversible variable speed prime mover for propelling it back and forth on the bridge, and also provided with hoisting mechanism in the form of a depending lifting element, a crane controlling system comprising a single control member mounted in the cage so that it is movable substantially horizontally in two space directions from a neutral position and having spring means for urging it into its neutral position, and control connections between the control member and the prime movers whereby the latter are so controlled in response to movement of the control member from its neutral position that they cause the lifting element to move in the same direction as said control member, said control connections being designed and constructed in such manner that in connection with movement of the control member from its neutral position they so control the prime movers that the speed of operation thereof is proportional to the amount or degree of movement of said control member.

29. In combination with a crane embodying an overhead bridge mounted to travel back and forth in a direction transverse to its length and provided with a reversible variable speed prime mover for propelling it back and forth, and a carriage mounted on the bridge to travel lengthwise thereof, provided with a reversible variable speed prime mover for propelling it back and forth on the bridge, and also provided with a hoisting mechanism and including a depending lifting element, a crane controlling system comprising a single control member mounted so that it is movable substantially horizontally in two space directions from a neutral position, and control connections between the control member and the prime movers whereby the latter are so controlled in response to movement of the control member from its neutral position that they cause the lifting element to move in the same direction as said control member, said control connections being designed and constructed in such manner that in connection with movement of the control member from its neutral position they so control the prime movers that the speed of operation thereof is proportional to the amount or degree of movement of said control member.

MURRAY G. CLAY.